United States Patent [19]

Takafuji et al.

[11] Patent Number: 4,471,204
[45] Date of Patent: Sep. 11, 1984

[54] METHOD FOR JOINING OF ARTICLES BY ENERGY BEAM AND APPARATUS FOR CONTROLLING SAID METHOD

[75] Inventors: Hideo Takafuji; Katsuhiro Minamida; Shigehiro Yamaguchi, all of Kawasaki, Japan

[73] Assignee: Nippon Steel Corporation, Tokyo, Japan

[21] Appl. No.: 415,936

[22] Filed: Sep. 8, 1982

[30] Foreign Application Priority Data

Feb. 15, 1980 [JP] Japan ................................ 55-17571

[51] Int. Cl.³ ............................................. B23K 27/00
[52] U.S. Cl. ......................... 219/121 LD; 219/121 LC
[58] Field of Search ................. 219/121 EC, 121 ED, 219/121 LC, 121 LD, 121 LP, 121 LQ, 121 LR, 121 LT, 121 LW, 121 LA, 121 LB

[56] References Cited

U.S. PATENT DOCUMENTS

| | | | |
|---|---|---|---|
| 3,974,016 | 8/1976 | Bondybey et al. | 219/121 LA X |
| 4,029,535 | 6/1977 | Cannon et al. | 219/121 LA X |
| 4,069,080 | 1/1978 | Osborne | 219/121 LC X |
| 4,185,185 | 1/1980 | Adlam | 219/121 LD X |
| 4,187,408 | 2/1980 | Heile | 219/121 LD X |

*Primary Examiner*—C. L. Albritton
*Attorney, Agent, or Firm*—Cushman, Darby & Cushman

[57] ABSTRACT

Conventional beam-welding methods have disadvantages in that the total energy efficiency is low and that the bonding zone and HAZ spread due to indirect heating of the weld zone. In the present invention, a wedge-shaped space is formed between the non-contact parts of the articles, and an energy beam, such as a laser beam, an ion beam, and a plasma arc, is projected into the wedge-shaped space so as to heat the weld zone or the parts of articles which will later be joined. The controlling apparatus of the present invention controls the power of, for example, a laser beam based on the detecting of travelling speed of sheets and the like.

15 Claims, 5 Drawing Figures

METHOD FOR JOINING OF ARTICLES BY ENERGY BEAM AND APPARATUS FOR CONTROLLING SAID METHOD

BACKGROUND OF THE INVENTION

1. Field of the Invention

The present invention relates to a method for joining articles by a laser beam, electron beam or other energy beam as well as an apparatus for controlling the method.

2. Description of the Prior Art

Joining of a plurality of articles is a fundamental, indispensable technique in numerous industrial field. There are a number of joining methods, of which welding is one of the most frequently practiced.

Typical welding methods are arc welding and gas welding. Recently, however, a welding method using an energy beam, i.e., a beam having high energy density, such as a laser beam or an electron beam, has been developed. This welding method is hereinafter referred to as the beam-welding method.

The high energy-density of energy beam offers a number of advantages. However, the total energy efficiency in the beam-welding method is lower than that of the arc welding and gas welding methods because of the low efficiency of conversion of electric energy to beam energy. The conventional beam welding methods are explained with reference to FIGS. 1A and 1B.

BRIEF DESCRIPTION OF THE DRAWINGS

In the drawings

FIGS. 1A and 1B illustrate conventional beam welding methods for joining the base metal 10 of one article with the base metal 12 of another article. (The term "articles" used herein includes base metals of an article to be joined together by welding.) Referring to FIG. 1A, the two base metals 10 and 12 are brought into tight contact with one another at the lateral ends. The energy beam is projected down onto the resultant contact surface as indicated by the arrow $F_1$ to melt and join the base metals 10 and 12. Beads 14 form on the butt surface as the result of this melting. In this illustration, the energy beam is kept stationary and the base metals 10 and 12 are displaced in the arrow direction $F_2$. Obviously, however, the base metals 10 and 12 may also be kept stationary and the energy beam may be displaced in the direction opposite to the arrow direction $F_2$.

Referring to FIG. 1B, the base metal 10 is placed over the base metal 12. The energy beam is projected down onto the base metal 10 as indicated by the arrow $F_1$ at an intensity to melt the metal down through the base metal 10 to the base metal 12. The maximum thickness of the base metals 10 and 12 capable of being joined by this beam-welding method is dependent upon the energy of the energy beam. It is approximately 5 mm in the case of a laser beam having an energy of 2 kw or approximately 10 cm in the case of an electron beam having an energy of 100 kw.

Figure 1A:
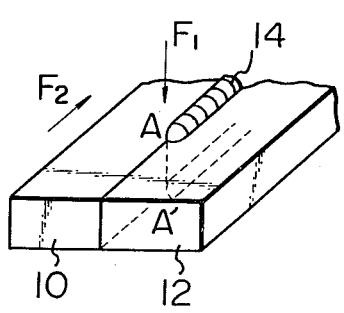
FIGS. 1A and 1B illustrate conventional beam-welding methods.
Figure 1B:
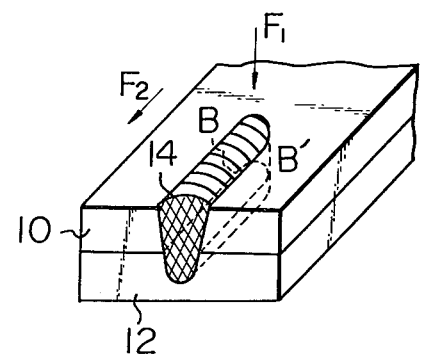

In both the conventional beam-welding methods illustrated in FIGS. 1A and 1B, the energy of the energy beam is applied not directly but indirectly to the welding-front surfaces AA' and BB'. That is, the energy beam is first projected down onto the surface of an article, i.e., from the side of the contact surface of the base metal 10 and the base metal 12 in the case of FIG. 1A, and the surface of the base metal 10 in the case of FIG. 1B, then the energy absorbed on the surface is conducted to the welding-front surfaces AA' and BB' by melting of the base metals 10 and 12 and thermal conduction.

In conventional beam-welding methods, therefore, there is a loss of energy due to the irradiation or reflection of the energy beam from the surface of the article. In addition, the indirect heating causes spreading of the bonding zone and HAZ (heat affected zone) of the articles, resulting a considerably greater energy being required than that necessary for the joining itself.

These reasons, as well as the low efficiency of conversion of electric energy to beam energy, make effective input of a large amount of energy in the weld zone impossible and thus make large-scale, high speed welding according to conventional beam-welding methods difficult.

SUMMARY OF THE INVENTION

It is an object of the present invention to provide a beam-welding method in which the energy beam can be highly effectively used for joining and the welding efficiency is enhanced as compared with the prior art.

It is another object of the present invention to provide a beam-welding method which allows joining of articles which are difficult to join by conventional beam-welding methods.

It is a further object of the present invention to provide an apparatus for controlling and automating the beam-welding method of the present invention.

In accordance with the objects of the present invention, there is provided a method for joining articles comprising the steps of bringing articles partly in contact with each other and forming a wedge-shaped space between the non-contact part of said articles, the interior contact part of the wedge-shaped space forming a weld zone, and projecting at least one energy beam into the wedge-shaped space, thereby effecting heating and joining of the weld zone.

In accordance with the objects of the present invention there is also provided an apparatus for controlling a beam-welding (fusion-bonding) method comprising a rotatable means for guiding at least one of the articles in a curved path, thereby bringing the articles partly in contact with each other and forming a wedge-shaped space between the non-contact part of the articles, the interior contact part of the wedge-shaped space forming a weld zone; a means for projecting at least one energy beam from an open side into the wedge-shaped space; a means for detecting the rotational speed of the rotatable means; a pressing means for pressing the articles together at the weld zone; a means for detecting the unevenness of the wedge-shape forming parts of the articles; and a computing and controlling means, connected to an energy beam projecting means and receiving signals from the rotational speed detecting means and the unevenness detecting means, for controlling the energy beam projecting means so that the fusion depth of the articles is at least equal to the detected unevenness.

There is also provided an apparatus for controlling a beam-welding (diffusion-bonding) method comprising a rotatable means for guiding at least one of the articles in a curved path, thereby bringing the articles partly in contact with each other and forming a wedge-shaped space between the non-contact part of the articles, the interior contact part of the wedge-shaped space forming a weld zone; a means for projecting at least one energy beam into the wedge-shaped space; a means for detecting the rotational speed of the rotatable means; a pressing means for pressing the articles at the weld zone; a means for detecting the pressure of the pressing means; a means for detecting the unevenness of the wedge-shape forming parts of the articles; and a computing and controlling means, connected to an energy beam projecting means and receiving signals from the rotational speed detecting means and the pressure detecting means, for controlling the energy beam projecting means so that the power of the energy-beam per unit length of the articles is sufficient for causing diffusion between the articles pressed at the detected pressure.

DESCRIPTION OF THE PREFERRED EMBODIMENTS

Figure 2:
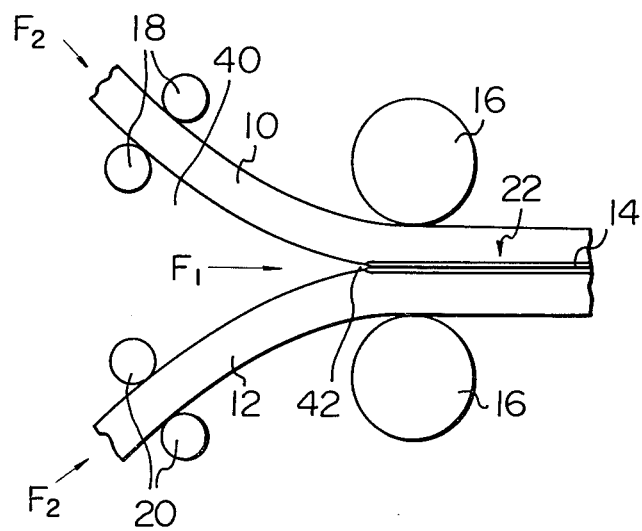
FIG. 2 illustrates an embodiment of the beam-welding method according to the present invention for joining of sheets.

FIG. 2 illustrates the principle of the beam-welding method according to the present invention. The base metals 10 and 12 are partly in contact with each other and a wedge-shaped space 40 is formed between the non-contact part of the base metals 10 and 12. After the interior-contact part 42, the weld zone 22 is formed between the base metals 10 and 12. The energy beam is projected from an open side to the interior-contact part 42 as indicated by the arrow line $F_1$, so that the weld zone 22 is either: melted and then fusion-bonded or heated to the diffusion-temperature.

The base metals 10 and 12 are guided by the guide rollers 18 and 20, respectively, along a curved path to bring them in partial contact at the weld zone 22. When the entire opposing surfaces of the base metals 10 and 12 are to be joined, the energy beam is in the form of a thin strip having the same width as the width of the base metals 10 and 12. Alternatively, a spot-form energy beam can be scanned over the width of the base metals 10 and 12. When the interior contact part 42 is to be joined at selected portions, a plurality of energy beams can be applied simultaneously to the selected joining portions. Alternatively, a single energy beam can be successively applied to the selective joining portions by displacing that beam. For example, when only the lateral ends of the base metals 10 and 12 are to be joined, two laser beams can be applied simultaneously to these lateral ends. Alternatively, a single laser beam may be applied to one of the lateral ends and then displaced and applied to the other lateral end.

An example where energy-beam welding is used to join the entire surface of the base metals 10 and 12 is the cladding of two metal sheets, for example a mild steel sheet and a stainless steel sheet. Since the stainless steel sheet is usually thinner than the mild steel sheet, it is advisable to guide only the stainless steel sheet in a curved path and to linearly convey the mild steel sheet.

The base metals 10 and 12 are integrally engaged with each other by the pressing rolls 16 when guided to the weld zone 22. Therefore, the wedge-shaped space 40 successively narrows and finally disappears. The wedge-shaped space 40 has a V-shape but may have an L-shape in a case where only one of the base metals is guided along a curved path.

Since the energy beam is projected toward the interior contact part 42, the energy beam is directly absorbed therein. Alternatively, the energy beam may be reflected many times from the opposing surfaces of the base metals 10 and 12 to converge to and finally be absorbed in the interior contact part 42. In any case, the energy of the energy beam is utilized for direct heating of the weld zone or the opposing surfaces which will later be joined. In addition, even if multiple reflection of energy beam takes place, this results in neither energy loss nor spreading of the bonding zone and HAZ. The beam-welding method according to the present invention is therefore highly efficient and makes it possible to considerably lessen the bonding zone and HAZ and to join thick articles without adversely affecting their surface- and material-properties.

The pressing rolls 16 squeeze the weld bead 14 formed in the base metals 10 and 12 to lessen thickness by the melting amount of the weld zone 22 in the case of joining the entire surfaces. The beam-welding method of the present invention can be applied not only for fusion bonding but also for diffusion bonding. In the case of diffusion bonding, the weld zone 22 is heated but not fused and the pressing rolls 16 press the base metals 10 and 12 to realize diffusion between the heated base metals 10 and 12.

Figure 3:
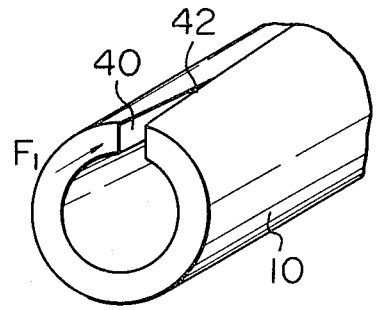
FIG. 3 illustrates another embodiment for joining of a tube.

FIG. 3 shows the beam-welding method of the present invention applied to the production of an electric-resistance welded tube. The base metal 10 in the form of a sheet is deformed as shown in FIG. 3 by various known rolls (not shown) used in the production steps of an electric-resistance welded tube. Just before the lateral ends of the base metal 10 are butted, the wedge-shaped space 40 is formed between the lateral ends of the base metal 10 when the base metal is successively deformed in the form of a pipe. The energy beam is projected into the wedge-shaped space 40 toward interior contact part 42 so as to fuse or heat the lateral ends of the base metal 10. The lateral ends of the base metal 10 are then fusion- or diffusion-bonded while pressed against each other.

When electric-resistance welded pipe is produced by conventional high-frequency welding, a high-frequency current is conducted via the contact tips to the wedge-shaped space of the base metal. The high-frequency current path may, however, not be formed directly at the bottom of the wedge-shaped space but may be detoured around that bottom. This is caused by unevenness of the base metal near the fusion-bonding zone and results in cold welding. Contrary to this, since, in the beam-welding method of present invention, the energy beam can be injected into the interior part of the wedge-shaped space 40, cold welding can be avoided.

For fusion welding, it is advisable that an underbar (not shown) be provided at the bottom of the wedge-shaped space 40, thereby preventing the dropping off of the molten metal. If necessary, an additional underbar can be provided on the top of the wedge-shaped space 40. In conventional methods, the weld beads projecting from the inner surface of the electric welded tube must be removed by grinding. This removal by grinding is very complicated because it is impossible to see the weld beads to be removed. The underbar can prevent the projection of the weld beads and flatten the weld beads, making the inner-surface grinding unnecessary. If an additional underbar is provided, the energy loss is furthermore reduced and welding efficiency is furthermore enhanced, since the wedge-shaped space 40 behaves as a complete black body.

The description with reference to FIGS. 2 and 3, might give the impression that in order to apply the energy beam to just the weld zone 22 at the bottom of the wedge-shaped space 40, the energy beam must be in the form of a spot or blade having a sharp energy-distribution in the welding-width direction. This is, however, not always necessary. The energy beam may be of a thickness where it is repeatedly reflected from the walls of the wedge-shaped space 40 when projected thereto. In this case, the space-energy density of the energy beam is gradually increased to such a level that the base metals 10 and 12 are heated at or immediately before the interior contact part 42.

Figure 4:
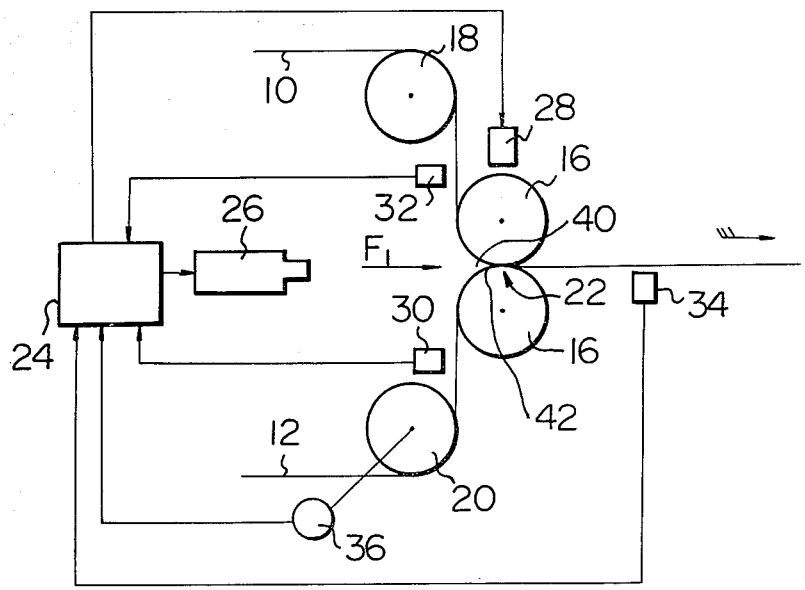
FIG. 4 illustrates a schematic diagram for controlling the welding conditions of the beam welding method according to the present invention.

Referring to FIG. 4, an embodiment of the present invention for automatically carrying out of the beam-welding method is illustrated. The base metals 10 and 12, in the form of thin metal sheets, are laminated and joined at the weld zone 22. The base metals 10 and 12 are guided by the rotatable means, i.e., guide rolls 18 and 20, respectively, in a curved path. The base metals 10 and 12 are conveyed from above and below to the weld zone 22 and are integrally laminated by the pressing means, i.e., pressing rolls 16. The wedge-shaped space 40 is therefore formed between the non-contact parts of base metals 10 and 12. At least one laser-irradiating device 26, i.e., the energy beam projecting means, projects the energy beam toward the interior contact part 42 to heat the entire opposing surfaces of the base metals 10 and 12. The fusion depth in the case of fusion-bonding is, for example, approximately 0.1 mm. The upper pressing roll 16 is pressed down by the pressure mechanism 28.

The base metals 10 and 12 are pressed between the pressing rolls 16 for joining.

In the case of fusion welding, surface-roughness testers 30 and 32, i.e., the unevenness detecting means, optically measure the unevenness of the base metal joining-surfaces. The roughness signals representing the unevenness are transmitted to the computing and controlling unit 24 of the laser-irradiating device 26. The computing and controlling unit 24 controls the laser-irradiating device 26 so that the fusion depth is at least equal to the unevenness. A tachometer 36, i.e., the rotational-speed detecting means, detects the rotational speed of the guide roll 26. Therefore, the travelling speed of the base metals 10 and 12 can be calculated based on the detected rotational speed. The computing and control unit 24 receives the signals of the base metal travelling speed and unevenness of the base metals 10 and 12. Based on these signals and the given data of base metals 10 and 12, such as thermal properties of the steel sheets, it computes the power of the laser beam necessary for fusion-welding of the base metals 10 and 12. As a result, the power of the laser-irradiating device 26 is controlled.

In the case of diffusion-bonding, the signals from the tachometer 36, and the pressure mechanism 28 are transmitted to the computing and controlling unit 24. The unit 24 then controls the laser-irradiating device 26 so that the power of the laser beam per unit length of the base metals 10 and 12 is sufficient for causing diffusion between the base metals 10 and 12 being pressed at the detected pressure.

The weld-defect detecting device 34 is preferably provided after the weld zone 22 and detects the weld defects formed in the joined surfaces of the base metals 10 and 12 utilizing, for example, an ultrasonic. If a weld defect is detected, the detected signal is transmitted to the computing and control unit 24 in a feedback circuit. The computing and control unit 24 comprises a logic circuit which controls the power of the laser-irradiating device 26 based on the detected weld defects.

Although the descriptions hereinabove mainly relate to the case in which the energy beam is a laser, an electron beam and plasma arc can also be used. In addition, base metals other than steel sheets can be joined by the beam-welding method of the present invention.

The present invention is hereinafter explained with reference to an example.

The lamination welding of 1 mm thick cold-rolled sheets was carried out using the apparatus schematically illustrated in FIG. 4. The laser-irradiating device 26 was a carbon dioxide($CO_2$)-laser. The base metals 10 and 12 were travelled at a speed of 5 meters/second. The laser power was controlled so that it amounted to 10 kw per 10 mm of the welding width. The beam-welding method could be successfully carried out.

The beam-welding method described above is advantageous over the conventional method illustrated in FIGS. 1A and 1B in the following points.

A. The laser power is small. (If the method of FIG. 1B were carried out at the same base-metal travelling speed as in the example, the laser power would be 100 kw per 10 mm of the welding width.)

B. The material and surface properties of the base metals 10 and 12 are not adversely affected appreciably. (Since the energy beam is projected downward through the base metal 10 or projected upward through the base metal 12 according to the method of FIG. 1B, molten metal is instantaneously formed through the base metal 10 or 12. The method of FIG. 1B therefore tends to adversely affect the surface or material properties of the base metal 10 or 12.)

We claim:

1. A method for joining of articles comprising the steps of:
bringing said articles partly in contact with each other and forming a wedge-shaped space between the non-contact part of said articles, the interior contact part of said wedge-shaped space forming a weld zone, and projecting at least one energy beam into said wedge-shaped space, said energy beam having a thickness in the perpendicular direction to the welding-width direction, so that said energy beam is reflected from the walls of the wedge-shaped space, thereby effecting heating and joining of said weld zone.

2. A method according to claim 1, wherein said at least one energy beam is one energy beam projected in the form of a thin strip having the same width as the width of the articles.

3. A method according to claim 1, wherein said at least one energy beam is a plurality of energy beams applied simultaneously to selected joining portions of said interior contact part.

4. A method according to claim 1, wherein said at least one energy beam is a single energy-beam successively applied to selected joining portions of said interior contact part by displacement of said single laser beam.

5. A method according to claim 1, wherein said wedge-shaped space successively narrows and finally disappears.

6. A method according to claim 1, further comprising a step of guiding at least one of the articles along a curved path so that said articles are brought into partial contact with each other.

7. A method according to claim 6, wherein said wedge-shaped space is formed between two sheets.

8. A method according to claim 1, wherein said articles are melted and fusion-bonded at said weld zone.

9. A method according to claim 8, wherein an underbar is provided at the bottom of said wedge-shaped space.

10. A method according to claim 9, wherein an additional underbar is provided on the top of said wedge-shaped space.

11. A method according to claim 8, further comprising a step of squeezing the articles and lessening their thickness by the melting amount of said weld zone.

12. A method according to claim 1, further comprising a step of integrally engaging said articles by pressing rolls at said interior contact part.

13. A method according to claim 12, wherein said wedge-shaped space is formed between two lateral ends of a sheet being successively deformed in the form of a pipe.

14. An apparatus for controlling a beam-welding method comprising:
 a rotatable means for guiding at least one of the articles in a curved path thereby bringing them into partial contact and forming a wedge-shaped space between the non-contact part of said articles, the interior contact part of said wedge-shaped space forming a weld zone;
 a means for projecting at least one energy beam into said wedge-shaped space;
 a means for detecting tne rotational speed of said rotatable means;
 a pressing means for pressing said articles at said weld zone;
 a means for detecting the unevenness of the wedge-shape forming parts of said articles;
 a computing and controlling means, operably connected to the energy beam projecting means and receiving signals from the rotational speed detecting means and the unevenness detecting means, for controlling the energy beam projecting means so that fusion depth of the articles is at least equal to the detected unevenness 15. An apparatus for controlling a beam-welding method comprising:
 a rotatable means for guiding at least one of the articles in a curved path thereby bringing them into partial contact and forming a wedge-shaped space between the non-contact part of said articles, the interior contact part of said wedge-shaped space forming a weld zone;
 a means for projecting at least one energy beam into said wedge-shaped space;
 a means for detecting the rotational speed of said rotatable means;
 a pressing means for pressing said articles at said weld zone;
 a means for detecting the pressure of said pressing means;
 a means for detecting the unevenness of the wedge-shape forming parts of said articles;
 a computing and controlling means, operably connected to the energy beam projecting means and receiving signals from the rotational speed detecting means and the pressure-detecting means, for controlling the beam-energy projecting means so that the power of energy-beam per unit length of the articles is sufficient for causing diffusion between the articles being pressed at the detected pressure.

* * * * *